United States Patent [19]
Swisher, Jr.

[11] Patent Number: 5,452,966
[45] Date of Patent: Sep. 26, 1995

[54] PAVING MATERIAL MACHINE HAVING A TUNNEL WITH AUTOMATIC GATE CONTROL

[76] Inventor: George W. Swisher, Jr., 1500 Dorchester Dr., Oklahoma City, Okla. 73120

[21] Appl. No.: 185,428

[22] Filed: Jan. 21, 1994

Related U.S. Application Data

[63] Continuation-in-part of Ser. No. 44,849, Apr. 8, 1993.
[51] Int. Cl.$^6$ ................................................. E01C 19/18
[52] U.S. Cl. ........................... 404/72; 404/84.05; 404/108
[58] Field of Search .................................. 404/72, 84.05, 404/84.1, 101, 108

[56] References Cited

U.S. PATENT DOCUMENTS

| | | | |
|---|---|---|---|
| 2,911,892 | 11/1959 | Pollitz | 94/46 |
| 3,678,817 | 7/1972 | Martenson et al. | 94/46 |
| 3,997,277 | 12/1976 | Swisher, Jr. et al. | 404/84 |
| 4,290,820 | 9/1981 | Swisher, Jr. et al. | 134/6 |
| 5,015,120 | 5/1991 | Brock et al. | 404/108 |
| 5,035,534 | 7/1991 | Brock et al. | 404/81 |
| 5,073,063 | 12/1991 | Brown | 404/101 |
| 5,232,305 | 8/1993 | Bassett et al. | 404/101 |

OTHER PUBLICATIONS

Article entitled "Electronic Control Develops Positive Traction" by Richard T. Schneider, Sep. 1992, *Hydraulics & Pneumatics*, p. 10.

Primary Examiner—Ramon S. Britts
Assistant Examiner—James A. Lisehora
Attorney, Agent, or Firm—Dunlap & Codding

[57] ABSTRACT

A paving machine having a gate control system for maintaining a target depth of paving material on the surface to be paved. The paving machine includes a wheeled frame having a lengthwise tunnel and a conveyor for moving paving material through the tunnel. A pair of gates are provided to control the volume of paving material being conveyed from the rear of the tunnel. The position of each gate is automatically adjusted by a hydraulic cylinder, a control valve, an electro-hydraulic control system, an ultrasonic sensor assembly and a cable assembly. Each sensor assembly includes a sensor which is positioned to define a target distance between the sensor and the paving material. The target distance corresponds to the target depth for the paving material. The sensor detects the actual distance between the sensor and the paving material and produces an electrical output proportional to this actual distance. The electro-hydraulic control system utilizes the electrical output of the sensors to open or close the rear gates to adjust the volume of paving material being discharged to the surface. A cable assembly links the movement of each rear gate with the corresponding sensor assembly to lower and elevate the sensor in response to the closing and opening of the rear gate.

14 Claims, 9 Drawing Sheets

PAVING MATERIAL MACHINE HAVING A TUNNEL WITH AUTOMATIC GATE CONTROL

CROSS-REFERENCE TO RELATED APPLICATIONS

This application is a continuation-in-part of U.S. application Ser. No. 08/044,849, filed Apr. 8, 1993, entitled "Paving Material Machine Having Tunnel Capacity and a Drive System Using Rotary Transducers."

BACKGROUND OF THE INVENTION

1. Field of the Invention

The present invention relates to machines for receiving, distributing and laying down paving material.

2. Description of Related Art

In building and rebuilding roads, paving material is typically delivered to the work-site by truck. Often the trucks dump the paving material directly into receiving hoppers of the road construction machines. In some cases, the paving material is windrowed on the surface by the trucks and the road construction machines pick up the windrow of paving material.

Whether the paving material is dumped into hoppers or windrowed, a problem exists in balancing the delivery of paving material by the trucks with the use of the paving material by the road construction machines. Increasing the capacity of the receiving hoppers on the road construction machines is one way to address this problem. Of course, there are practical limits on the length and width of such hoppers. In some machines, the capacity of the receiving hopper has been increased by extending the hopper walls vertically. Vertical extension of the hopper, however, creates problems in dumping paving material into the hopper.

Another problem relates to the traction of such machines. Small wheels or hard rubber bogies are often used for the front wheels and large wheels are typically mounted at the rear. The paving material load on the machine may place a substantial amount of the weight on the front wheels. Such machines may be equipped with four-wheel drive, but the weight may cause small front tires to sink and lose traction.

SUMMARY OF THE INVENTION

The present invention is a road construction machine having a frame with a tunnel extending from the front to the rear of the frame. The tunnel provides a surge capacity for paving material in addition to the capacity provided by a receiving hopper or a windrow pickup assembly.

In order to achieve improved traction, the present invention includes uniformly sized front and rear wheels and a modification of a conventional positive traction electro-hydraulic system. A pair of rotary transducers is provided to monitor the turning angle of the front and rear wheels of the road construction machine. The turning angle input is used to allow the outside wheel to speed up and the inside wheel to slow down when the machine is in a turn.

One object of the present invention is to provide a machine with a tunnel having paving material capacity to substantially increase the overall paving material capacity of the machine.

Another object of the present invention is to provide a machine which transfers paving material without the use of high-wear components such as drag slat conveyors.

Another object of the present invention is to provide a machine which transfers paving material by remixing to prevent segregation of the aggregate making up the paving material.

Yet another object of the present invention is to provide a paving material machine with uniformly sized wheels to ensure proper ground support regardless of weight distribution on the machine. It is also an object of the present invention to adjust wheel speeds in turns to improve turning traction of the machine.

Still another object of the present invention is provide a machine with an operator's console at the front so that an operator of the machine is able to supervise the loading of the machine with paving material.

Other objects, features and advantages of the present invention are apparent from the following detailed description when read in conjunction with the accompanying drawings and appended claims.

BRIEF DESCRIPTION OF THE DRAWINGS

FIG. 15 is a top plan view of a paving machine having automatic gate control constructed in accordance with the present invention.

FIG. 16 is a top plan view of a portion of the tunnel and the automatic gate control assembly of the paving machine shown in FIG. 15.

FIG. 19 is a partly diagrammatical side view of the automatic gate control assembly with the gate in the maximum high position.

DERAILED DESCRIPTION OF THE PREFERRED EMBODIMENTS

Figure 1:
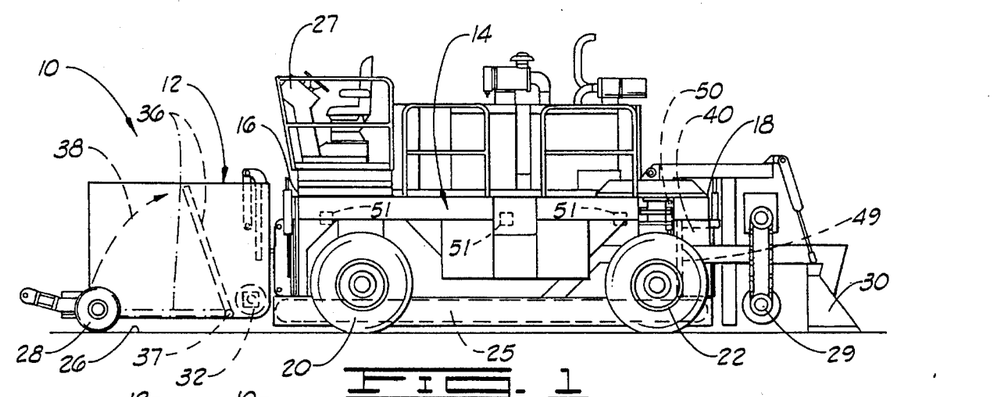
FIG. 1 is a side elevation of a front hopper paving material lay down machine constructed in accordance with the present invention.
Figure 2:
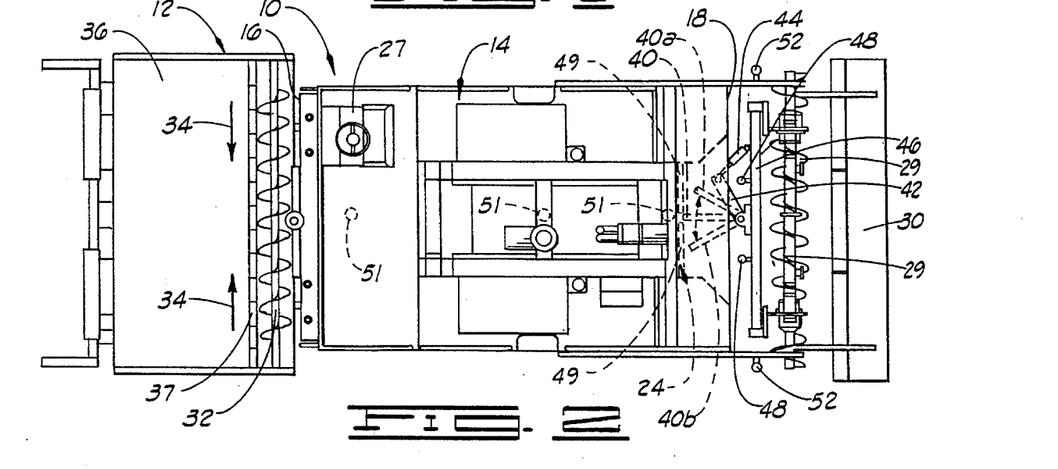
FIG. 2 is a top plan view of the lay down machine of FIG. 1.
Figure 3:
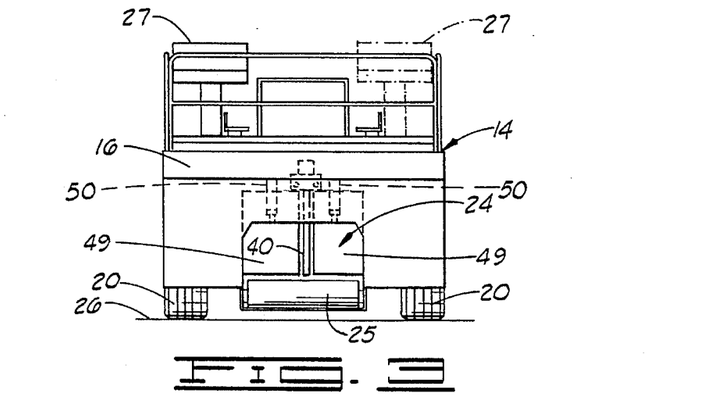
FIG. 3 is a partly diagrammatical front elevation of the lay down machine of FIG. 2 as viewed from behind the hopper.

Referring to the drawings in general, and to FIGS. 1 through 3 in particular, shown therein and designated by the general reference numeral 10 is a paving material lay down machine with a front hopper 12.

The machine 10 includes a frame 14 having a front end 16 and a rear end 18. Sets of front wheels 20 and rear wheels 22 support the front end 16 and rear end 18 of the frame 14, respectively.

A tunnel 24, which is open at both ends, extends through the frame 14 from the front end 16 to the rear end 18 of the frame 14. A transfer conveyor 25 is rotatably mounted in a lower portion of the tunnel 24 and extends substantially throughout the length of the tunnel 24. As best shown in FIG. 3, the transfer conveyor 25 is a belt conveyor, as opposed to a drag slat conveyor, and extends continuously across the width of the tunnel 24. By eliminating drag slat conveyors, which are high wear and high maintenance components, the cost of maintaining the machine 10 is greatly lessened.

It should be appreciated that the machine 10 includes a conventional engine and drive, steering and operating controls for propelling the machine 10 over a surface 26. It should also be noted that the front wheels 20 and the rear wheels 22 are uniform in size to bear the load effectively no matter how the weight is distributed over the machine 10. The wheels 20 and 22 typically comprise high-pressure inflatable tires, rated in the range of 115 psi.

An operator's console 27 is provided for an operator of the machine 10. As best shown in FIG. 3, the operator's console 27 is adapted to be positioned at a variety of locations across the frame 14. With this construction, the operator may move the console 27 to a position anywhere between one side (console 27 of FIG. 3 in solid lines) and the other side (console 27 of FIG. 3 in broken lines). The best position of the console 27 for viewing of the operation by the operator varies depending on how the machine 10 is being used with other road construction vehicles.

The operator of paving machines are often positioned at the rear to oversee the paving operation taking place. In the case of the present invention, the material level sensing and controls described hereinbelow allow the operator to be toward the front of the machine 10 to supervise the material loading.

The hopper 12 has an open top for receiving paving material from a truck or conveyor. A transfer opening in the rear wall of the hopper 12 mates with the front opening of the tunnel 24 for transfer of paving material from the hopper 12 into the tunnel 24 of the frame 14. A set of hopper wheels 28 support the hopper 12 for movement over the surface 26.

A pair of feed augers 29 are mounted behind the rear opening of the tunnel 24 to evenly distribute paving material across the surface 26. A lay down screed 30 is provided to the rear of the feed augers to produce an even, uniform surface of pavement.

A transfer auger 32 is rotatably mounted across a lower rear portion of the hopper 12 to urge paving material into the tunnel 24 through the transfer opening of the hopper 12. It should be appreciated that the flighting of the transfer auger 32 is one-half left-handed and one-half right-handed to force paving material toward the rear center of the hopper 12, as indicated by direction arrows 34. By augering material into the tunnel 24, the material is re-mixed to prevent segregation and thereby maintain a uniform mixture.

Even with augering, segregation may occur when the quantity of paving material in the hopper 12 reaches a low level. With the hopper 12 about one-third or one-fourth full, larger aggregate tends to tumble to the sides of the hopper 12 and augering may not compensate for this segregation.

In order to reduce the segregation associated with a low volume of paving material in the hopper 12, a hopper plate 36 is pivotally mounted on hinges 37 to the bottom of the hopper 12. As illustrated by direction arrow 38 in FIG. 1, the hopper plate 36 is pivoted from the bottom of the hopper 12 to an angular position to feed the last one-third or one-fourth of the paving material more uniformly into the transfer auger 32. Electric, hydraulic, pneumatic or any other suitable power and controls (not shown) may be utilized to pivot the hopper plate 36 between the bottom of the hopper 12 and the feed position.

At the rear of the machine 10, a diverter paddle 40 is pivotally mounted to extend into the rear of the tunnel 24. An actuating arm 42 and cylinder 44 are connected to the diverter paddle 40 to locate the diverter paddle 40 into one of a range of positions between those designated by reference characters 40a and 40b. As best shown in FIGS. 1 and 3, the diverter paddle 40 extends from the top of the tunnel 24 almost all the way to the transfer conveyor 25.

A support assembly 46 is mounted to the frame 14 and two feed sensors 48 are attached to the front of the support assembly 46 behind the diverter paddle 40. The feed augers 29 are mounted directly behind the feed sensors 48. The feed sensors 48 are spaced apart with one feed sensor 48 toward each side of the tunnel 24 to read the level of paving material on the surface 26 in front of the feed augers 29. The readings of the feed sensors 48 are sent to the electro-hydraulic control system of the machine 10 to balance the level of paving material in front of the feed augers 29 by adjusting the position of the diverter paddle 40.

A further control feature consists of two vertical gates 49 mounted to the frame 14 at the rear of the tunnel, one rear gate 49 to the side of the center line of the conveyor 25. Each rear gate 49 is moved up and down by a corresponding rear gate cylinder 50. The amount of mix distributed to each screed auger 29 may be controlled by the diverter paddle 40, by the rear gates 49 or by the combination of the rear gates 49 and the diverter paddle 40.

The two rear gates 49 are controlled independently by the feed sensors 48. By metering the amount of material being distributed to the augers 29, the rear gates 49 allow the conveyor 25 to run until the mix has accumulated in the tunnel 24 to a level measured by a plurality of level sensors 51 located along the length of the tunnel 24. The output signals from the tunnel level sensors 51 is processed by the control system to start or stop the conveyor 25 if the material level at either end or at the center of the tunnel 24 is below or above the desired preset level.

In similar fashion, two screed sensors 52 are mounted to opposite sides of the frame 14 in front of the feed augers 29. The screed sensors 52 read the level of paving material in front of the feed augers 29 to maintain a desired "head" of paving material for the screed 30. The readings of the screed sensors 52 are sent to the electro-hydraulic system of the machine 10 to operate the feed augers 29.

For example, if the level of paving material being fed to the left side of the machine 10 is insufficient, the feed auger 29 on the left side is operated to feed more paving material to the left side. Similarly, the feed auger 29 on the right side is operated when the level of paving material being distributed to the right side is inadequate.

With reference now to FIGS. 4 through 7, shown therein is another embodiment of a paving material lay down machine, designated generally by reference character 10A. The machine 10A is a lay down machine adapted to pick up a windrow of paving material from the surface 26.

It should be appreciated that the machine 10A includes the same basic wheeled frame 14 with the tunnel 24, electro-hydraulic control system and operator's console 27 as the machine 10. Machine 10A, however, comprises the following components and feature which differ from those of machine 10.

Figure 4:
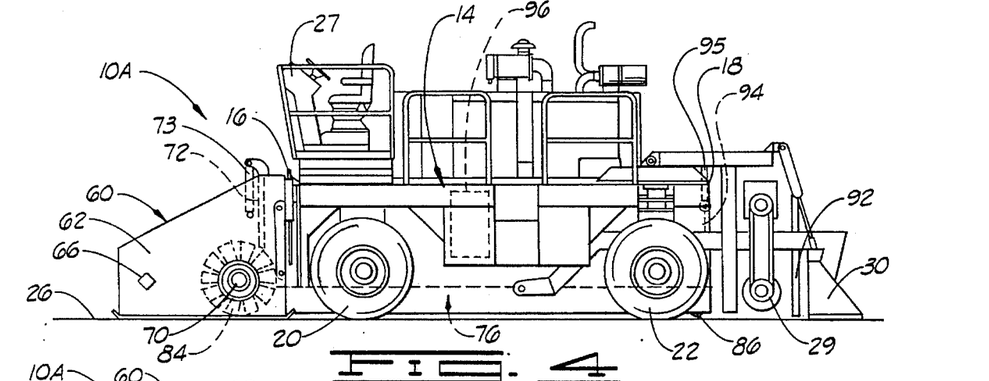
FIG. 4 is a side elevation of a windrow pickup paving material lay down machine constructed in accordance with the present invention.
Figure 5:
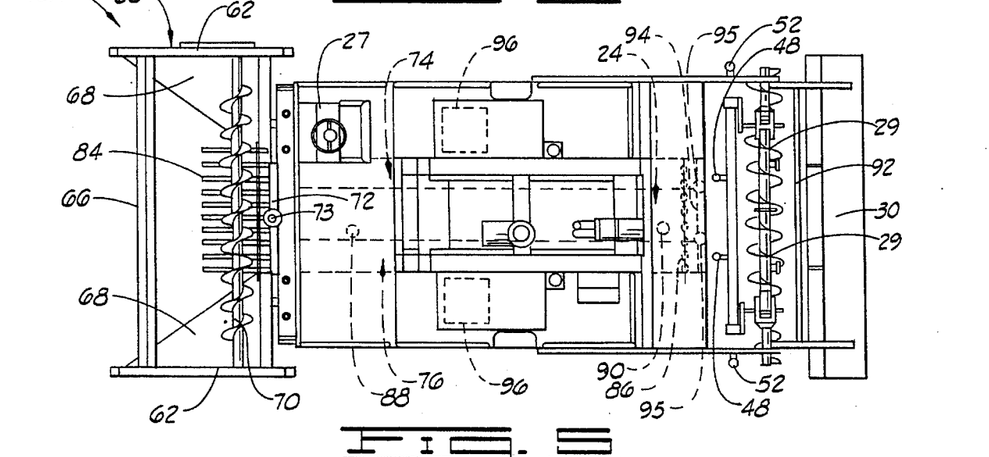
FIG. 5 is a top plan view of the lay down machine of FIG. 4.

As illustrated by FIGS. 4 and 5, the machine 10A includes a windrow pickup assembly 60 mounted to the front end 16 of the frame 14. The windrow pickup assembly 60, which is open in front, top and bottom, includes two sides 62 which are supported by a cross member 66. From each side 62, a side member 68 angles downward and inward to channel paving material toward the rear center of the windrow pickup assembly 60.

A windrow auger 70 is rotatably mounted between the sides 62 of the windrow pickup assembly 60 to feed paving material toward the center of the windrow pickup assembly 60. From the center of the windrow auger 70 to one end 62, the flights of the windrow auger 70 are left-handed to urge paving material toward the center as the windrow auger 70 is rotated. Similarly, from the center of the windrow auger 70 to the opposite end 62, the flights are right-handed also to feed paving material toward the center as the windrow auger 70 is rotated.

The rear wall of the windrow pickup assembly 60 has a discharge opening which communicates with the tunnel 24 of the machine 10A. A front gate 72 is mounted over the discharge opening of the windrow pickup assembly 60. A front gate actuating cylinder 73 is operatively connected to the front gate 72 to open and close the front gate 72 for regulating the amount of paving material being transferred from the windrow pickup assembly 60 into the tunnel 24.

Figure 6:
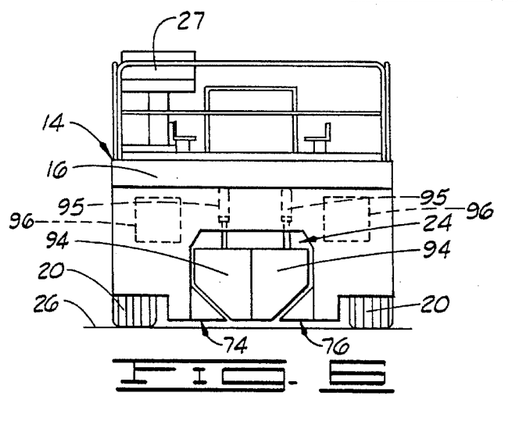
FIG. 6 is a partly diagrammatical, front elevation of the lay down machine of FIG. 5 as viewed from behind the windrow pickup assembly.
Figure 7:
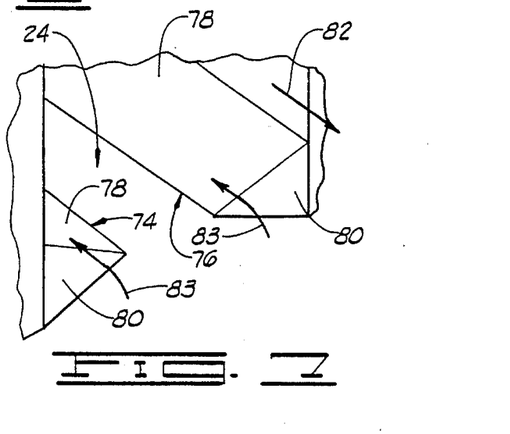
FIG. 7 is perspective view of a front portion of the frame, tunnel and tunnel side forms of the lay-down machine of FIG. 4.

As illustrated by FIGS. 6 and 7, a pair of tunnel side forms 74 and 76 are located within the tunnel 24. The tunnel side forms 74 and 76 extend from the frame 14 and oppose one another in a lower portion of the tunnel 24 substantially throughout the length of the tunnel 24.

As best shown in FIG. 7, each tunnel side form 74 and 76 angles downward and inward into the tunnel 24 to define an angled upper surface 78 for supporting a portion of the paving material within the tunnel 24. In addition, each tunnel side form 74 and 76 includes a front face 80 which angles upward and rearward into the tunnel 24. As the machine 10A moves forward, as indicated by direction arrow 82 in FIG. 7, an upper portion of the windrowed paving material is carried up and over the front faces 80 of the tunnel side forms 74 and 76. As indicated by direction arrows 83 in FIG. 7, the front faces 80 of the tunnel side forms 74 and 76 direct paving material onto the upper surfaces 78 of the tunnel side forms 74 and 76. In this manner, the tunnel side forms 74 and 76 slice through the windrowed paving material and reduce the load imposed on the machine 10A by plowing through the windrow.

As best illustrated by FIG. 6, a lower layer of the windrow remains on the surface 26 beneath and between the tunnel side forms 74 and 76. The weight of the windrow upon this lower layer may compact the lower layer and adversely affect the uniformity of the paving material.

In order to solve this lower layer compaction problem, a plurality of stirring paddles are mounted to the windrow auger 70 (FIGS. 4 and 5). One of the stirring paddles is designated by reference numeral 84 and is generally representative of the stirring paddles. As shown most clearly in FIG. 4, the stirring paddles 84 extend substantially to the surface 26 to stir up the lower layer of paving material as the windrow auger 70 is rotated.

As best shown in FIGS. 4 and 5, a chain 86 may provide an additional solution to the lower layer compaction problem. The chain 86 is suspended from the frame 14 or tunnel side forms 74 and 76 at the rear of the tunnel 24 with enough slack to drag through the lower layer of the windrowed paving material. By trailing through the lower layer of the paving material, the chain 86 breaks up compaction in the lower layer.

From the operator's console 27, the operator of the machine 10A cannot see the level of paving material within the tunnel 24. Therefore, a plurality of tunnel sensors are mounted within the tunnel to read the level of paving material at various points within the tunnel 24.

For example, as illustrated by FIG. 5, a front tunnel sensor 88 and a rear tunnel sensor 90 are mounted in the tunnel 24 to read the level of paving material at those two points in the tunnel 24. Typically, the electro-hydraulic control system receives the readings of the tunnel sensors 88 and 90, takes an average of the readings and automatically adjusts the position of the front gate 72 according to the average level of paving material within the tunnel 24. It should be understood that any number of tunnel sensors may be used and that number of tunnel sensors utilized typically depends on the length of the tunnel 24.

The amount of paving material leaving the rear opening of the tunnel 24 is regulated by a pair of rear gates 94. As best shown in FIG. 6, a pair of rear gate actuating cylinders 95 are connected to the frame 14 and the rear gates 94 to control the position of the rear gates 94. By operating the rear gate cylinders 95 to move the rear gates 94 up or down, the amount of paving material being transferred to each of the feed augers 29 is controlled.

The rear gate cylinders 95 are connected to the electro-hydraulic control system of the machine 10A. The paving material level readings of the feed sensors 48 are utilized by the electro-hydraulic control system for automatic positioning of the rear gates 94 by operating the rear gate cylinders 95. This operation has been described hereinabove.

In the windrow operation of machine 10A, there is no weight toward the front end 16 from a receiving hopper. Accordingly, the machine 10A tends to have uneven weight distribution, with more weight toward the rear 18 than toward the front 16. This load imbalance may adversely affect the traction of the front wheels 20.

To correct the weight distribution, a plurality of weights 96 may be mounted to the frame 14 of the machine 10A. As illustrated by FIGS. 4 through 6, the weights 96 are typically placed more toward the front wheels 20 than the rear wheels 22 and on each side of the frame 14. By placing more weight toward the front, improved traction and stability is provided to the front wheels 20. It should be appreciated, however, that compensating weights may be mounted at any points on the machine 10A to balance the overall load carried by the machine 10A.

Figure 8:
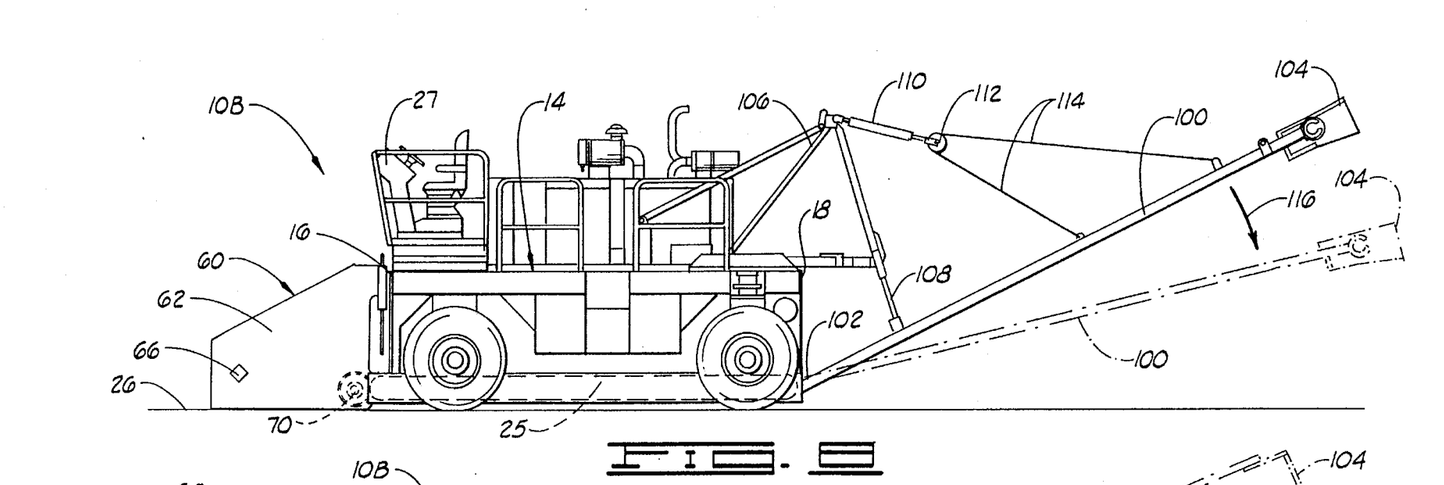
FIG. 8 is a side elevation of a paving material transfer machine constructed in accordance with the present invention.
Figure 9:
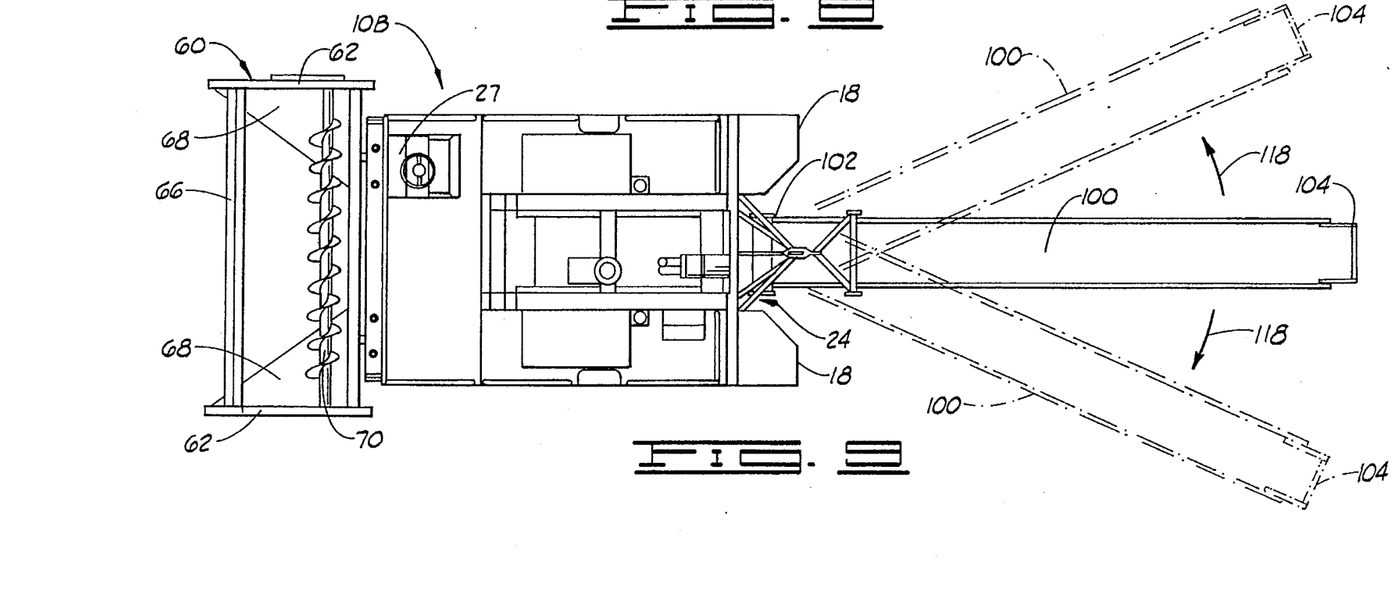
FIG. 9 is a top plan view of the transfer machine of FIG. 8.

Turning now to FIGS. 8 and 9, shown therein and designated by reference numeral 10B is a machine for transferring paving material. The machine 10B is constructed to pick up a windrow of paving material and to transfer the paving material to another machine or vehicle.

The machine 10B includes the basic frame 14 with front end 16, rear end 18, tunnel 24 and transfer conveyor 25, as described hereinabove. The windrow pickup assembly 60 previously described is attached to the front end 16 of the frame 14 and a placing conveyor 100 is mounted to the rear end 18. It should be appreciated the hopper 12 described hereinabove may be used in place of the windrow pickup assembly 60 with the machine 10B, if desired.

The placing conveyor 100 has a receiving end 102 and a discharge end 104. The receiving end 102 of the placing conveyor 100 is located to receive paving material from the rear end of the tunnel 24 in the frame 14 of the machine 10B. The discharge end 104 is positioned to feed paving material to another vehicle, such as a laydown machine.

It is desirable for the machine 10B to discharge paving material throughout a range of elevations for transfer of paving material to vehicles having different material receiving heights. Accordingly, the placing conveyor 100 is equipped with a pivotable support structure 106, telescoping suspension bars 108, a height-adjusting cylinder 110 and a pulley 112 with pulley lines 114.

With this arrangement, the piston of the cylinder 110 may be extended to lower the discharge end 104 of the placing conveyor 100 or may be retracted to raise the discharge end 104 of the placing conveyor 100. The lower position of the discharge end 104 of the placing conveyor 100 is shown in broken lines and the lowering movement is indicated by the direction arrow 116 in Figure 8.

The machine 10B should also be able to discharge paving material toward either side as well as directly to the rear of the machine 10B. In order to achieve this function, the placing conveyor 100 is adapted to be positionable throughout a range of orientations from side to side, as indicated by direction arrows 118 in FIG. 9. This construction allows the machine 10B to transfer paving material to another vehicle directly to the rear of the machine 10B or behind and to either side of the machine 10B.

Figure 10:
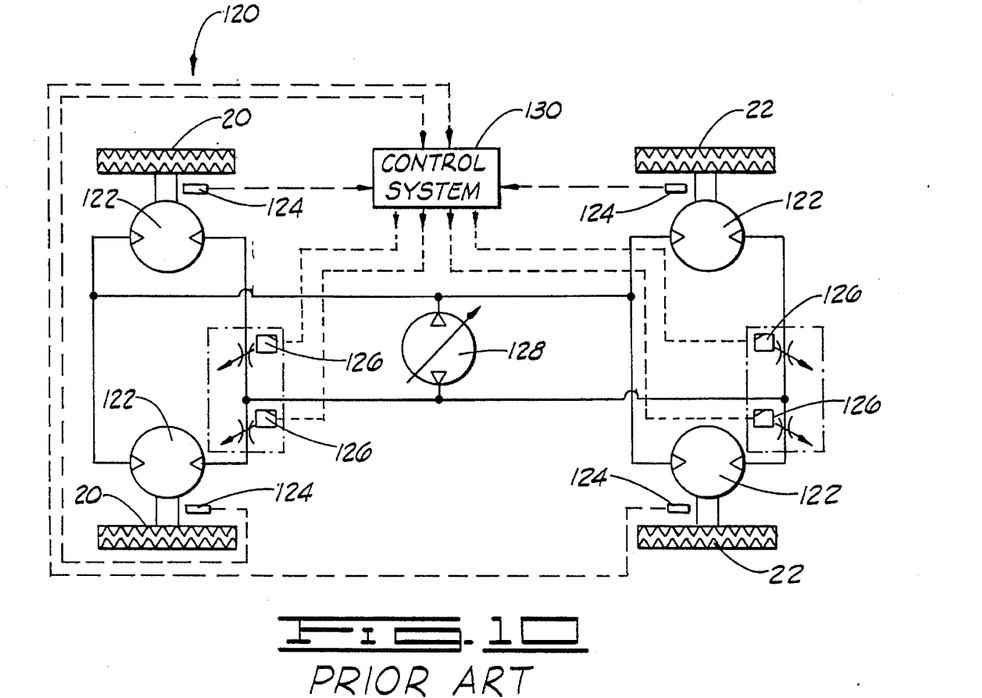
FIG. 10 is a schematic diagram of a prior art electro-hydraulic control system.

With reference now to FIG. 10, shown therein and designated by reference numeral 120 is a prior art positive traction system for a vehicle. It should be appreciated that the front wheels 20 and rear wheels 22 in FIG. 10 correspond to the front wheels 20 and rear wheels 22 of machines 10, 10A and 10B.

Each front wheel 20 and rear wheel 22 has a corresponding hydraulic motor 122 for driving the wheel 20 or 22 and a corresponding speed sensor 124 for reading the rotational speed of the wheel 20 or 22. The fluid pressure supplied to each hydraulic motor 122 is controlled by a corresponding spool valve solenoid 126.

A master pump 128 is provided to vary the overall fluid pressure and, in turn, the speed of the vehicle. A control system 130 is connected to the speed sensors 124 and the spool valve solenoids 126 to control the fluid flow to each wheel 20 and 22.

The operation of the prior art hydrostatic drive system 120 is briefly described as follows. The system 120 normally operates with all the spool valves 126 in full open position. The control system 120 receives electric input signals (shown as dashed lines in FIG. 10) from the speed sensors 124. The electric input signals indicate the speed of each wheel 20 and 22.

The control system 120 compares the speeds of each wheel. When the speed difference between two motors exceeds a predetermined value, the control system 120 sends a "slow-down" or "close-valve" electric command signal (shown as dotted lines in FIG. 10) to the spool valve solenoid 126 of the fast motor 122. In response to the electric command signal, the spool valve solenoid 126 closes to a preprogrammed degree and decreases the fluid flow to the fast motor 122.

The control system 120 constantly monitors and adjusts the speeds of the hydraulic motors 122. When one of the wheels 20 or 22 loses traction and speeds up, the system 120 slows down the flow to the slipping wheel and diverts more fluid pressure to the other, non-slipping wheels 20 and 22. This action allows more pressure to build on the non-slipping wheels to propel the machine.

Figure 11:
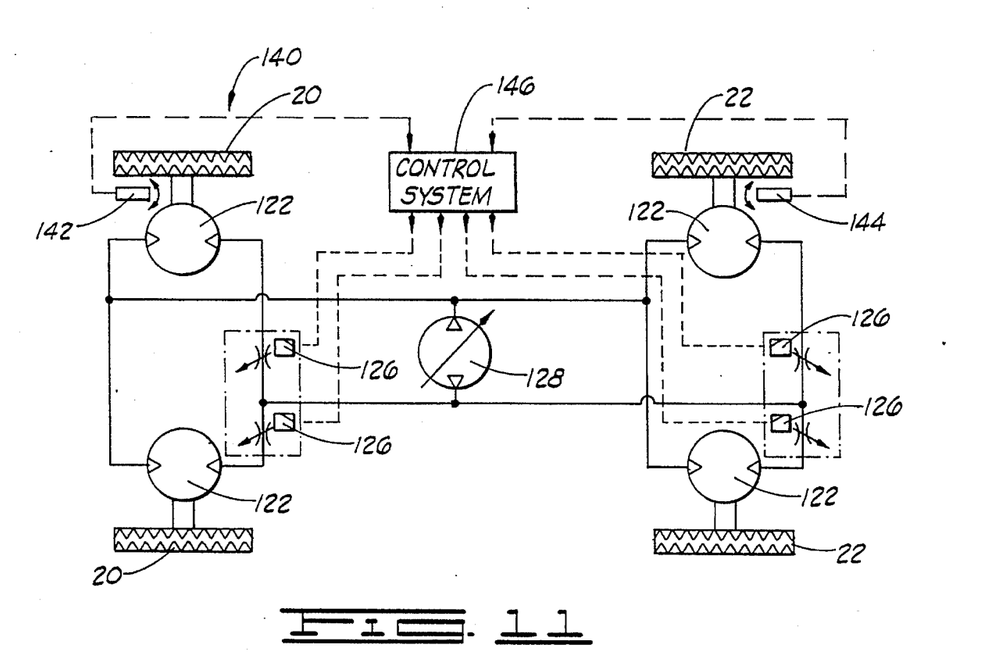
FIG. 11 is a schematic diagram of an electro-hydraulic control system constructed in accordance with the present invention.

Referring to FIG. 11, shown therein and designated by reference numeral 140 is an electro-hydraulic drive system having rotary transducers. Like the prior art system 120, the hydrostatic drive system 140 includes the front wheels 20, the rear wheels 22, hydraulic motors 122, valve spool solenoids 126, electric input signal connections (dashed lines), hydraulic lines (solid lines) and electric commands signal connections (dotted lines).

The system 140, however, has a front rotary transducer 142 detecting the turning position of the front wheels 20 and a rear rotary transducer 144 sensing the turning position of the rear wheels 22. Suitable rotary transducers are known in the art and are commercially available.

The control module 146 is constructed to receive electric input signals from the rotary transducers 142 and 144. When the front wheels 20 are turned, the electric input signal of the front rotary transducer 142 indicates to the control module 146 the direction and degree of turn of the front wheels 20. In relation to the direction and degree of turn of the front wheels 20, the control module 146 sends an electric input signal to close, by a preprogrammed amount, the spool valve 126 of the front wheel 20 on the inside of the turn. With this design, a portion of the fluid flow to the hydraulic motor for the inside front wheel is allowed to transfer to the outside wheel 20 and the speed of the inside front wheel 20 is thereby reduced and the speed of the outside front wheel 20 is increased throughout the turn of the machine.

The inside rear wheel 22 is allowed to slow down during a turn of the rear wheels 22 in the same manner as that just described for the front wheels 20. It should be appreciated that the hydrostatic drive system 140 may be used for the front wheels only, the rear wheels only or for both the front and the rear wheels. The drive system 140 also may be adapted for use with a three-wheeled vehicle instead of a four-wheeled vehicle. Moreover, the hydrostatic drive system 140 may be used with a vehicle propelled by three or four tracks rather than wheels.

Figure 12:
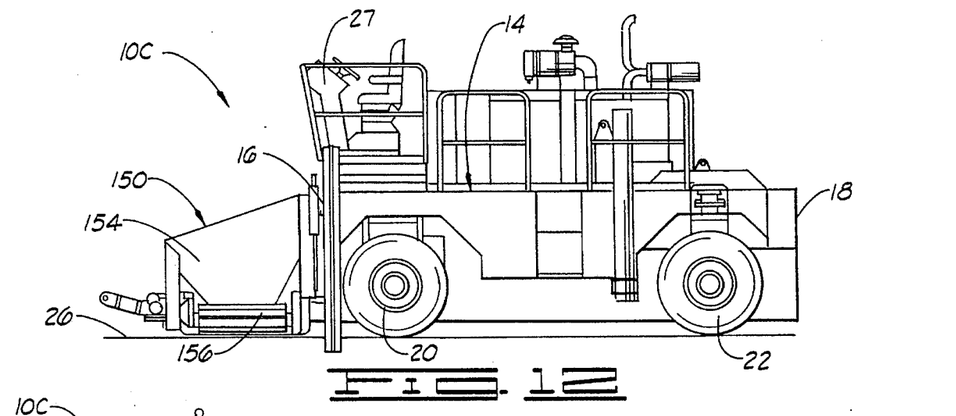
FIG. 12 is a side elevation of a road widening machine constructed in accordance with the present invention.
Figures 13, 14:
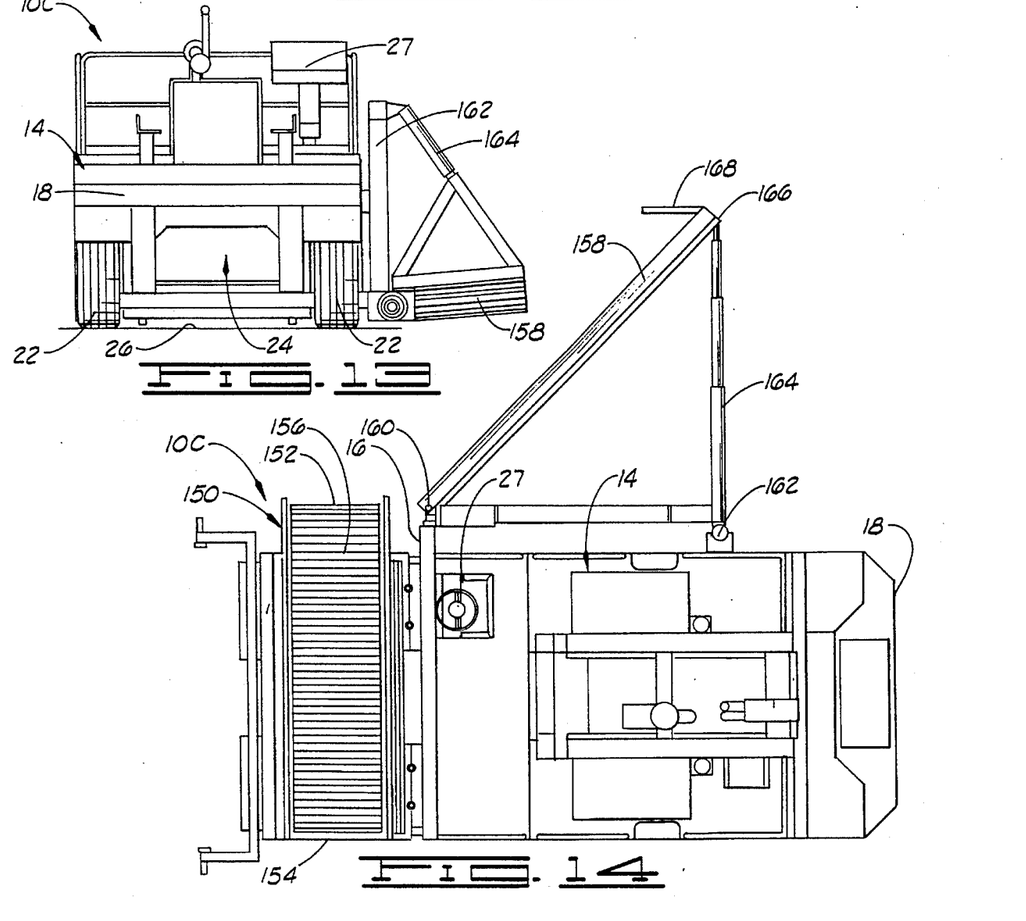
FIG. 13 is a rear elevation of the road widening machine of FIG. 12.
FIG. 14 is a top plan view of the road widening machine of FIG. 12.

Turning to FIGS. 12 through 14, shown therein and designated by reference numeral 10C is a paving material machine for widening a road. It should be appreciated that the machine 10C is configured from the frame 14 having the tunnel 24 as described hereinabove. In addition, the machine 10C typically includes the electro-hydraulic drive system 140 just described.

A side-conveying hopper 150 adapted to receive paving material from transport trucks is mounted to the front 16 of the machine 10C. The hopper 150 has side plates which may be removed so that paving material can be conveyed out one of either sides of the hopper 150. In FIG. 14, for example, one side 152 of the hopper 150 is open to convey out paving material and the opposite side 154 is closed.

A transverse conveyer 156 is rotatably mounted at the bottom of the hopper 150 to move paving material out of the hopper 50. The rotation of the transverse conveyor 156 is typically reversible for conveying paving material out of the hopper 150 to one of either sides 152 and 154 of the hopper 150.

As best shown in FIGS. 13 and 14, the machine 10C includes a blade 158 which is side-mounted to the frame 14 from a front post 160 and a rear post 162. A rear cylinder 164 is located between the rear post 162 and the distal end 166 of the blade 158 to adjust the height of the blade 158. In addition, the front post 160 is adapted to be raised and lowered to adjust the front elevation of the blade 158.

A retaining plate 168 is attached to the distal end 166 of the blade 158 to retain the paving material in front of the blade 158. The retaining plate 168 also serves to maintain a head of paving material for the blade 158 to level off.

In operation, paving material is dumped into the hopper 150 from transport trucks and the paving material is conveyed out of the open side of the hopper 150. The speed of the transverse conveyor 156 regulates the discharge rate of the paving material. The operator sets the elevation of the blade 158 to distribute the desired depth of paving material to the side of the machine 10C.

Vehicles like the machine 10C are often required to make tight turns. The electro-hydraulic drive system 140 provides substantially equal traction to the inside and outside wheels when the machine 10C is turned.

EMBODIMENT OF FIGS. 15–19

Turning now to FIG. 15, shown therein and designated by reference character 10D is another embodiment of a paving machine constructed in accordance with the present invention. The paving machine 10D is similar to the paving machine 10, but includes an automatic gate control system 170 in place of the diverter paddle 40.

The automatic gate control system 170 includes a pair of modified rear gates 49D and rear gate cylinders 172, a pair of sensor assemblies 174 and a pair of cable assemblies 176. The cable assemblies 176 link the movement of the rear gates 49D and the sensor assemblies 174.

As illustrated by FIG. 16, each rear gate 49D is supported by a pair of gate arms 178, which are pivotally mounted within the tunnel 24 of the paving machine 10D. The rear gates 49D and the corresponding gate arms 178 are typically bolted together, but may be connected in any suitable manner.

The rear gate cylinders 172 are mounted to a first support member 180 which extends across the frame 14 of the paving machine 10D. To the rear of the gate cylinders 172, the sensor assemblies 174 are mounted to a second support member 182, which also extends across the frame 14 of the paving machine 10D.

Each cable assembly 176 includes a cable 184, which extends between the corresponding rear gate 49D and the corresponding sensor assembly 174. Each sensor assembly 174 comprises a vertically movable sensor 186 for detecting the distance from the sensor 186 to the paving material below. With this construction, each cable assembly 176 links the corresponding sensor assembly 174 to cause movement of the sensor 186 in response to movement of the rear gate 49D.

Figure 17:
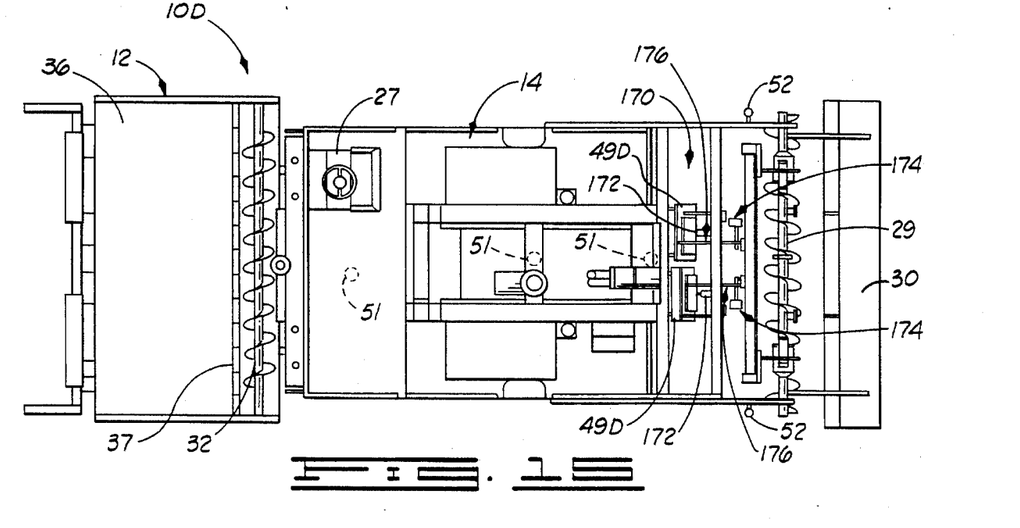
FIG. 17 a rear elevation of the automatic gate control assembly.

Turning now to FIG. 17, shown therein is the gate control system 170 in greater detail. Each gate cylinder 172 is clevis-mounted to the first support member 180 and the rod 188 of each gate cylinder 172 is clevis-mounted to the lower end of the corresponding rear gate 49D.

As illustrated by the rear gate 49D on the left in Figure 17, the rod 188 of each cylinder 172 is extended to lower (to close) the corresponding rear gate 49D. Conversely, the rod 188 of each cylinder 172 is retracted to raise (to open) the corresponding rear gate 49D, as represented by the rear gate 49D on the right in FIG. 17.

A scale rod 190 is attached to each rear gate 49D and extends vertically above the frame 14 of the paving machine 10D. Furthermore, a height scale 192 is mounted to one of the hand rails 194 of the paving machine 10D. Each scale rod 190 is mounted to slide along the corresponding height scale 192 in response to movement of the corresponding rear gate 49D. A pointer 195 is attached to each scale rod 190. With this arrangement, each pointer 195 provides a visual indication on the corresponding height scale 192 to show the relative position of the corresponding rear gate 49D.

Turning to the sensor assemblies 174, each sensor assembly 174 includes a guide bracket 196, a guide bar 198, a cross bar 200, a mounting bar 202, a sensor bracket 204 and one of the sensors 186. Each guide bracket 196 is secured to the second support member 182 (not shown in FIG. 17). Furthermore, each guide bracket 196 is shaped to receive the corresponding guide bar 198 and to allow the corresponding guide bar 198 to slide up and down therethrough.

While one end 206 of each guide bar 198 is journaled through the corresponding guide bracket 196, the other end 208 is secured to the corresponding cross bar 200. One end 210 of the mounting bar 202 is also secured to the cross bar 200. Furthermore, one end 211 of the cable 184 of the cable assembly 176 is attached to the cross bar 200 at a point between the attachment of the guide bar 198 and the mounting bar 202.

The sensor bracket 204 is affixed to the mounting bar 202 and is adapted to securely hold the corresponding sensor 186. Typically, the sensor bracket 204 is attached to the mounting bar 202 with bolts or the like so that the sensor bracket 204 may be positioned on the mounting bar 202 at a variety of locations.

An ultrasonic device is typically utilized for each of the sensors 186. Suitable devices are the MCX130 or the MCE114 ultrasonic sensor systems available from the Sauer-Sundstand Company. This type of sensor sends an ultrasonic burst toward a target and measures the delay between the time that the burst is sent and the time that an echo from the burst is detected. The delay is proportional to the distance between the sensor and the target. In addition, the sensor produces an electrical output which is proportional to the delay and the distance between the sensor and the target.

Figure 18:
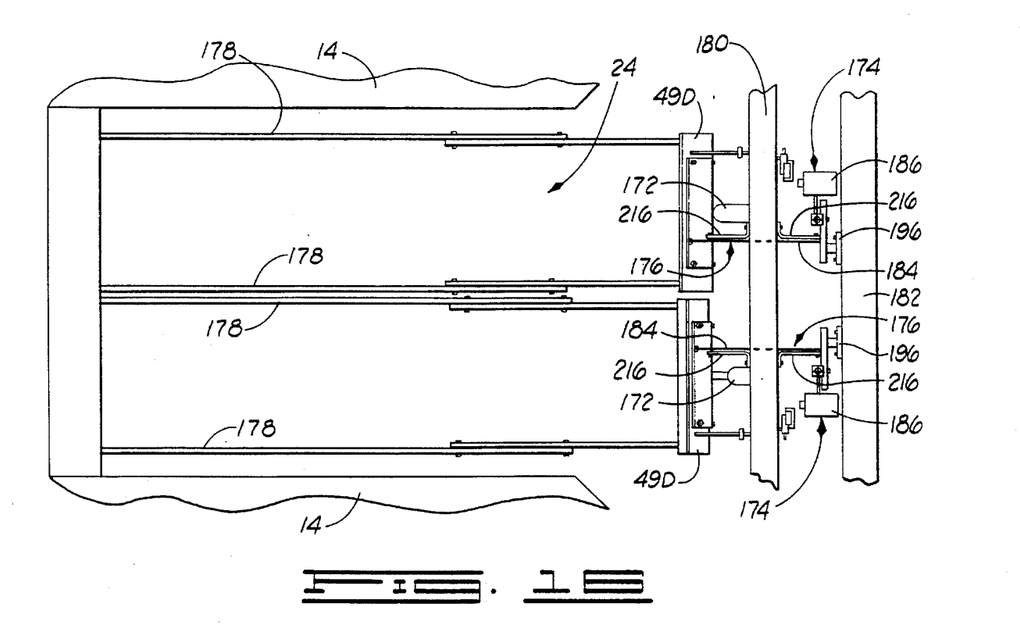
FIG. 18 is a partly diagrammatical side view of the automatic gate control assembly with the gate in the maximum low position.

Turning to FIGS. 18 and 19, shown therein is a partly diagrammatical side view of one of the rear gates 49D and its gate control system 170. The front end 212 of the gate arm 178 is mounted to the frame 14 such that the gate arm 178 pivots within the tunnel 24. The rear end 214 of the gate arm 178 is secured to the rear gate 49D. Each rear gate 49D is basically a curved plate extending across approximately one-half of the rear end of the tunnel 24.

As illustrated by FIGS. 18 and 19, each cable assembly 176 includes a pulley bracket 216 having a cable pulley 218 which is attached to each side of the first support member 180 for each rear gate 49D. One end 220 of each cable 184 is attached to the corresponding rear gate 49D and the other end 211 of each cable 184 is secured to the cross bar 200 of the corresponding sensor assembly 174.

Between the rear gate 49D and the sensor assembly 174, each cable 184 runs over the cable pulleys 218 and through a cableway 224 of the first support member 180. This construction allows each sensor 186 to slide freely up and down in response to movement of the corresponding rear gate 49D.

Each sensor 186 is connected electrically to an electro-hydraulic control system 226, which receives the electrical output of each sensor 186. In turn, the electro-hydraulic control system 226 is electrically connected to a hydraulic control valve 228 corresponding the gate cylinder 172 for each rear gate 49D. Each control valve 228 is hydraulically connected to the corresponding gate cylinder 172 to operate the cylinder 172.

The electro-hydraulic control system 226 actuates the control valve 228 in response to the electrical output from the corresponding sensor 186. When actuated, each control valve 228 may extend the rod 188 of the corresponding gate cylinder 172 to close the corresponding rear gate 49D or retract the rod 188 of the corresponding gate cylinder 172 to open the corresponding rear gate 49D.

It should be appreciated that suitable electro-hydraulic control systems 226 suitable for performing the functions described herein are known in the art. In addition, any conventional electro-hydraulic control valve 228 which operates in accordance with the capabilities described herein may be utilized.

Electro-hydraulic components are particularly suited for use in an application such as a paving machine. It should be understood, however, that electrical or pneumatic devices may be utilized rather than hydraulic components to control the position of the rear gates 49D.

OPERATION OF THE GATE CONTROL SYSTEM

The operation of the gate control system 170 is best understood with reference to FIGS. 18 and 19. As shown in these figures, the conveyor 25 carries paving material through the tunnel 24 for deposit in front of the auger 29. The operating positions of the rear gates 49D are utilized to control the volumetric rate of transfer of paving material from the tunnel 24 to the auger 29.

In operating the paving machine 10D, a target level of paving material to be maintained for distribution by the auger 29 is selected. In FIGS. 18 and 19, the target level is the phantom line designated by reference numeral 230. The target level 230 corresponds to a target distance between each sensor 186 and the paving material below each sensor 186. The target distance of the sensors 186 is designated by the conical ultrasonic burst 232 shown in solid lines.

A "too low" condition in the level of paving material is illustrated by FIG. 18. In this case, the distance between the sensor 186 and the paving material is greater than the target distance 232. The distance in excess of the target distance 232 is designated by the portion of the conical ultrasonic burst 234 shown in dashed lines.

In response to the detection of the "too low" condition, the electrical output from the sensor 186 to the electro-hydraulic control system 226 indicates that the corresponding gate 49D should be opened. In turn, the electro-hydraulic control system 226 actuates the control valve 228 to retract the rod 188 of cylinder 172 to raise the gate 49D.

As the gate 49D is pivoted upward, the cable assembly 176 lowers the sensor 186 toward the paving material. Eventually, the sensor 186 reaches the point where it is at the target distance 232 from the paving material. At this point, the electrical output of the sensor 186 no longer indicates to the electro-hydraulic control system 226 that the gate 49D should be opened or lowered. Through the control valve 228, the electro-hydraulic control system 226 stops retracting the rod 188 of the cylinder 172.

Turning now to FIG. 19, shown therein is a "too high" condition in the level of the paving material being conveyed onto the surface into the auger 29. In this case, the distance between the sensor 186 and the paving material is smaller than the target distance 232.

In this "too high" condition, the electrical output of the sensor 186 indicates to the electro-hydraulic control system 226 that the gate 49D should be closed. Accordingly, the electro-hydraulic control system 226 actuates the control valve 228 to extend the rod 188 of the cylinder 172 to close the gate 49D.

As the gate 49D is lowered, the sensor 186 is raised by the cable 184. When the distance between the sensor 186 and the paving material equals the target distance 232, the electrical output of the sensor 186 indicates to the electro-hydraulic control system 226 that the gate 49D should no longer be lowered. Operating upon electrical input from the electro-hydraulic control system 226, the control valve 228 actuates the cylinder 172 to stop extending the rod 188.

For purposes of illustration, the "too high" and "too low" conditions shown in FIGS. 18 and 19 are exaggerated. In typical operation, the sensors 186 and the gates 49D make small adjustments rather than sweeping movements to correct the level of paving material. It should be appreciated that the actual distances between the sensors 186 and the paving material are measured continuously and that the gates 49D are moved as needed in response to the measured distances. It should also be appreciated that the adjustment in the position of the gates 49D to correct the paving material level is performed as the paving machine 10D moves forward, as indicated by direction arrow 236.

Finally, it should be understood that the two sets of rear gates 49D, cable assemblies 176 and sensor assemblies 174 operate independently. Accordingly, the left and right rear gates 49D may be at different positions depending upon the actual distance between the corresponding sensor 186 and the paving material.

Changes may be made in the combinations, operations and arrangements of the various parts and elements described herein without departing from the spirit and scope of the invention as defined in the following claims.

What is claimed is:

1. A machine for placing paving material on a road surface, the machine comprising:

a mobile frame having a front end, a rear end and a tunnel extending from the front end to the rear end thereof, the tunnel having a discharge opening for placing a target depth for discharged paving material upon the road surface at the rear end of said frame;

a gate mounted to said frame for controlling the volume of paving material being discharged from the tunnel;

a sensor mounted to said frame and adapted to measure the actual distance between said sensor and the discharged paving material, said sensor being positioned to define a target distance between said sensor and the discharged paving material, the target distance corresponding to the target depth for discharged paving material;

means for opening said gate when the actual distance is greater than the target distance and for closing said gate when the actual distance is less than the target distance; and means for moving said sensor toward the discharged paving material when said gate is being opened and for moving said sensor away from the discharged paving material when said gate is being closed.

2. The machine of claim 1 further comprising:
conveyor means for transferring paving material through the tunnel to the discharge opening.

3. The machine of claim 1 wherein said sensor is an ultrasonic sensor.

4. The machine of claim 1 wherein said gate is curved.

5. The machine of claim 1 wherein said means for opening and closing said gate comprises a hydraulic cylinder.

6. The machine of claim 1 wherein said means for moving said sensor further comprises:

a pulley mounted to said frame above said gate and said sensor; and a cable suspended by said pulley and having one end attached to said gate and an opposite end operatively connected to said sensor.

7. A machine for placing paving material on a road surface, the machine comprising:

a mobile frame having a front end, a rear end and a tunnel extending from the front end to the rear end thereof, the tunnel having an opening for placing a target depth for discharged paving material upon the road surface at the rear end of said frame;

a pair of side-by-side gates mounted to said frame for controlling the volume of paving material being discharged from the tunnel;

a pair of sensors mounted to said frame for substantially vertical movement, each one of said sensors being positioned behind a corresponding one of said gates and being adapted to measure the actual distance between said sensor and the discharged paving material, said sensor being positioned to define a target distance between said sensor and the discharged paving material, the target distance corresponding to the target depth for discharged paving material;

means for opening each one of said gates when the actual distance of the corresponding one of said sensors is greater than the target distance and for closing the each one of said gates when the actual distance of the corresponding one of said sensors is less than the target distance; and means for moving each one of said sensors toward the discharged paving material when the corresponding one of said gates is being opened and for moving each one of said sensors away from the discharged paving material when the corresponding one of said gates is being closed.

8. The machine of claim 7 further comprising:
conveyor means for transferring paving material through the tunnel to the discharge opening.

9. The machine of claim 7 wherein said sensors are ultrasonic sensors.

10. The machine of claim 7 wherein said gates are curved.

11. The machine of claim 7 wherein said means for opening and closing each one of said gates comprises a hydraulic cylinder.

12. The machine of claim 7 wherein said means for moving each one of said sensors further comprises:

a pulley mounted to said frame above said gate and said sensor; and a cable suspended by said pulley and having one end attached to said gate and an opposite end operatively connected to said sensor.

13. A method of maintaining a target depth of paving material being discharged to a surface, the steps of the method comprising:

providing a machine having a tunnel with a discharge opening for transfer of paving material from the tunnel onto a surface, a gate movable to adjust the volume of paving material being transferred from the discharge opening, and a sensor mounted behind the gate and linked to the gate for movement toward the discharged paving material when the gate is being opened and away from the discharged paving material when the gate is being closed;

selecting a target depth for paving material discharged from the tunnel to the surface below the sensor;

determining a target distance between the sensor and the discharged paving material corresponding to the target depth;

utilizing the sensor to continuously measure the actual distance between the sensor and the discharged paving material;

when the actual distance is greater than the target distance, opening the gate until the actual distance is substantially equal to the target distance; and when the actual distance is less than the target distance, closing the gate until the actual distance is substantially equal to the target distance.

14. A method of maintaining a target depth of paving material being discharged to a surface, the steps of the method comprising:

providing a machine having a tunnel with a discharge opening for transfer of paving material from the tunnel onto a surface, a gate movable to adjust the volume of paving material being transferred from the discharge opening, and a sensor located behind the gate;

selecting a target depth for paving material discharged from the tunnel onto the surface below the sensor;

determining a target distance between the sensor and the discharged paving material corresponding to the target depth;

utilizing the sensor to continuously measure the actual distance between the sensor and the discharged paving material;

when the actual distance is greater than the target distance, opening the gate until the actual distance is substantially equal to the target distance;

when the actual distance is less than the target distance, closing the gate until the actual distance is substantially equal to the target distance;

moving the sensor toward the discharged paving material while the gate is being opened; and moving the sensor away from the discharged paving material while the gate is being closed.

\* \* \* \* \*